Figure 1:
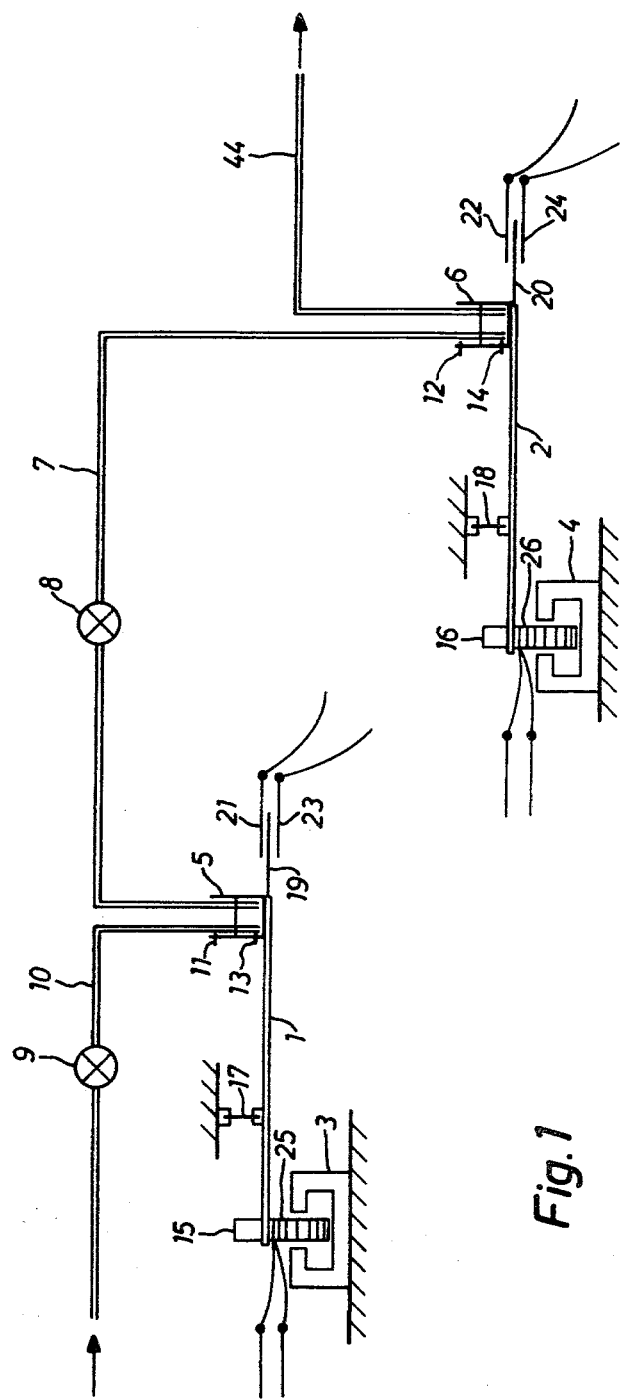

United States Patent [19]

Fredericks

[11] 4,195,516
[45] Apr. 1, 1980

[54] APPARATUS FOR CONTINUOUSLY MEASURING RATES OF FLOW OF A LIQUID

[75] Inventor: George Fredericks, Graz, Austria

[73] Assignee: Prof. Dr. Dr. Hans List, Graz, Austria

[21] Appl. No.: 948,276

[22] Filed: Oct. 3, 1978

[30] Foreign Application Priority Data

Oct. 3, 1977 [DE] Fed. Rep. of Germany ....... 2744444

[51] Int. Cl.$^2$ .............................................. G01F 1/00
[52] U.S. Cl. ................... 73/194 M; 222/40; 222/64
[58] Field of Search .................. 73/219, 220, 194 M; 177/145; 222/40, 64, 65, 71

[56] References Cited
U.S. PATENT DOCUMENTS 4,111,272  9/1978  Ricciardi et al. ................... 222/71 X

*Primary Examiner*—Herbert Goldstein
*Attorney, Agent, or Firm*—Ladas, Parry, Von Gehr, Goldsmith & Deschamps

[57] ABSTRACT

Apparatus for continuously measuring rates of flow of a liquid has two containers arranged serially in the liquid flow path and each associated with a self-levelling balance beam. Beam displacement is measured capacitively and used to alter current fed to a coil tending to maintain the beam level. The magnitudes of the currents necessary to maintain the beams level is a measure of the liquid level in the containers and is used to keep the liquid levels between pre-determined upper and lower values by controlling valves through which the liquid flows into the containers. The differentials of the currents with respect to time when the liquid levels are falling in both containers, are added. If the liquid level in the first container is rising, however, no differential is provided whereas the differential of the second container liquid level, when rising, is supplied to the adder but negatively. The adder provides an output which is a measure of the volume of liquid supplied by the apparatus.

9 Claims, 2 Drawing Figures

APPARATUS FOR CONTINUOUSLY MEASURING RATES OF FLOW OF A LIQUID

FIELD OF THE INVENTION

The invention relates to a device for the continuous measurement of the volume of flow of a liquid having a supply pipe and having an outlet pipe for this liquid.

STATE OF THE ART

Devices already exist for the continuous measurement of the volume of flow of a liquid. These are appliances which use the principle of coriolis force and appliances which measure pressure by means of an hydraulic bridge, in which the pressure difference in its arms is proportional to the volume of flow.

These known appliances can only work continuously and produce comparatively large errors with rates of flow of the order of 1 kg/hr, for example.

There are also devices known which work semicontinuously to measure the volume of flow. These devices are based on a method of successive measurements of the actual weight of a liquid in a container and simultaneous measurement of the time interval between the individual weight measurements. The measurement must naturally be interrupted during the refilling of the container. The interval between two weight measurements connot be made too short without having to take large measurement errors into account. This known method is suitable for providing accurate measurement results for low rates of flow and is less suitable for medium or high rates of flow.

OBJECT OF THE INVENTION

The object of the invention is to provide a device capable of continuous operation and having a high sensitivity even when the rate of flow of liquid is low.

THE INVENTION

In accordance with the present invention there is provided apparatus for the continuous measurement of the volume M of flow of a liquid, comprising first and second containers, a liquid flow path in which the first and second containers are serially arranged, first means providing a first electrical output which is a measure of the volume of liquid in the first container said first means responding to the weight of said first container, second means providing a second electrical output which is a measure of the volume of liquid in said second container, said second means responding to the weight of said second container and differentiating circuit means providing from the differentials of said first and second electrical outputs a signal which is a continuous measure of the volume of flow per unit time of liquid provided by the apparatus.

In the preferred arrangement the two containers are each disposed on a balance beam or a pressure cell of some suitable type, and the electrical signals produced which signify the instantaneous weights of the containers, and thus their contained liquid are differentiated. The volume of flow of liquid delivered by the apparatus is continuously determined from the two differential functions obtained, and the magnitude of the electrical signals can be used to ensure that the liquid levels in the two containers remains between upper and lower limits which are predetermined in each case.

The invention will now be described in more detail, by way of example, with reference to the accompanying drawings, in which:

IN THE DRAWINGS

Figure 2:
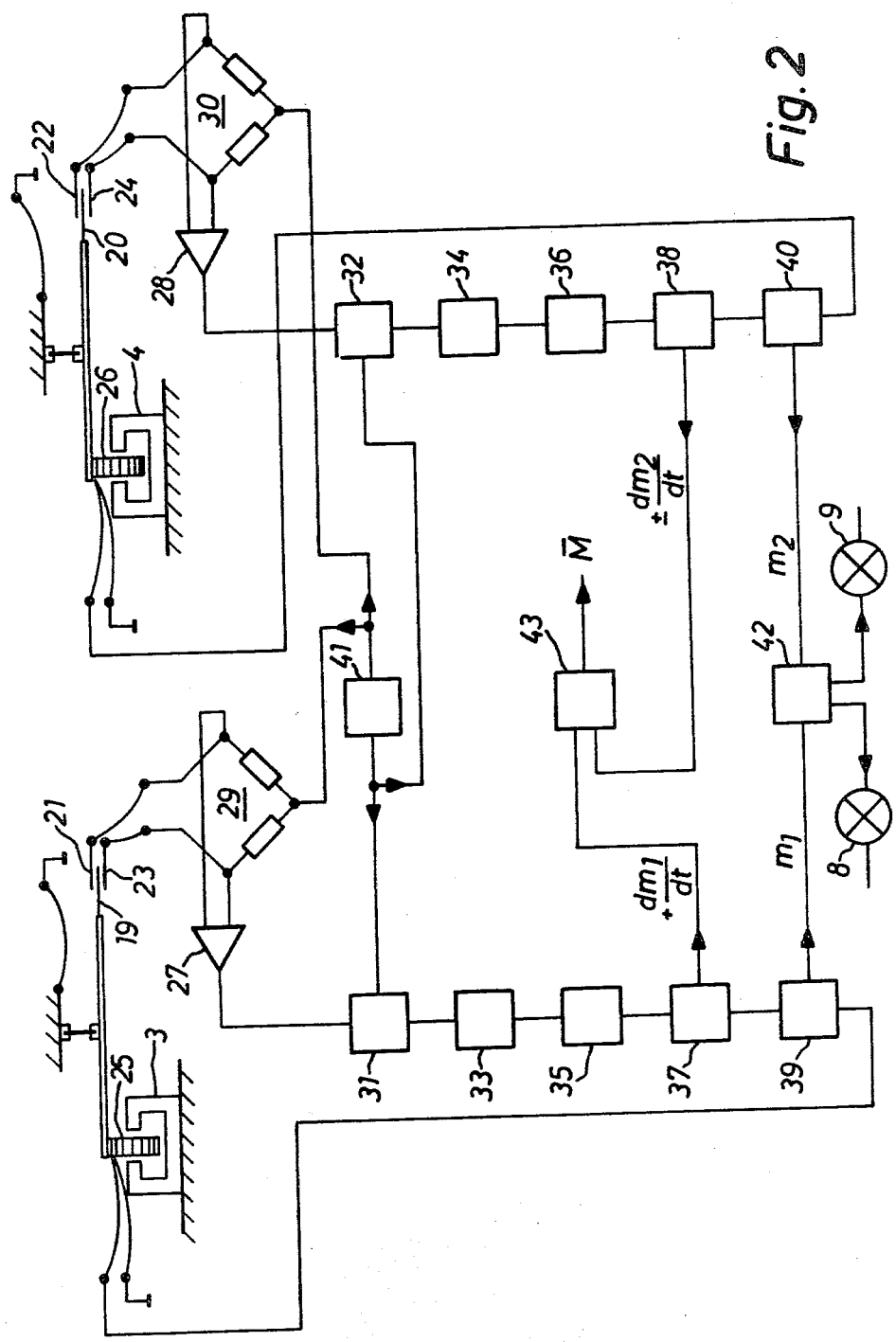

FIG. 1 shows schematically apparatus for carrying out the invention using electrical circuitry shown in FIG. 2; and FIG. 2 shows the electrical circuitry in block schematic form.

PREFERRED EMBODIMENT

FIG. 1 shows balances, which are connected together by means of circuitry shown in FIG. 2. Each balance has a beam 1 and 2 respectively, each of which is suspended by means of straps 17 and 18 made of a flexible resilient material. A container 5 and 6 respectively is disposed on one end of the beam 1 and 2 respectively of the balance in each case. These containers 5 or 6 have marks 11 and 13 respectively and 12 and 14 respectively, which indicates the upper and lower levels of the liquid in the container 5 or 6 in each case.

A pipe 10, in which a valve 9 is located, discharges into the first of these containers. The intake part of this pipe 10 is connected to a liquid source (not shown) or a supply container for liquid. The first container 5 is connected to the second container 6 which is disposed on the beam 2 of the other balance by a connecting pipe 7. A valve 8 is provided in the connecting pipe 7. An outlet pipe 44 for the liquid leads from the second container 6. The other end of the pipe 44, if the liquid is a fuel, may be connected to an internal combustion engine or the like.

The end of the beam 1 or 2 carrying the containers 5 and 6 is provided with a pointer 19, 20 which is disposed between two plates 21, 23 and 22, 24 respectively. The pointers 19, 20 form capacitors with variable capacity with the plates 21, 23 and 22, 24 respectively.

Counterweights 15, 16 to the containers 5,6 are disposed on the other end of the beam 1 and 2 respectively. The size of these counterweights 15, 16 is chosen such that they correspond to the average value of the weight on the other end of the beam. The counterweighted end of the beam 1 and 2 also carries a coil 25 and 26 which is positioned between the poles of a permanent C magnet 3 and 4 disposed beneath the end of the beam.

The coils 25, 26 co-operate with the permanent magnets 3,4 when energised, to provide forces which offset weight changes on the beams 1, 2 produced by changing liquid levels in the associated containers 5,6.

In the embodiment shown in FIG. 1, the liquid is supplied and flows between the two containers under the influence of gravity, but flows out however through the pipe 44 by suction. Disengageable pumps may of course also be used in these pipes and two balances may then be disposed at the same level.

The current supplied to the coils 25,26 controls the beam 1 or 2 in such a way that they always remain in the same position, apart from minor deflections which are necessary to generate error signals detected capacitively. The coils 25, 26 and the magnets 3,4 are designed in such a way that the power which they generate is proportional to the coil current.

Parts of FIG. 2 corresponding to parts of FIG. 1 are similarly referenced.

As shown in FIG. 2, the variable capacitors, comprising the electrodes 19, 21, 23 and 20, 22, 24 each form two branches of bridges 29 and 30 which are fed by a high frequency generator 41. 27 and 28 are amplifiers providing output signals significant of bridge imbalance. 31 and 32 are discriminators which provide outputs significant of phase differences between the signals from the generator 41 and the signals from the amplifiers 27 and 28. 33 and 34 are low-pass filters through which the discriminator outputs are fed to exercise control over controllable sources of current 35, 36 which generate the current required for the coils 25 and 26 in order to regulate the balance beams 1 and 2 in such a way that the bridges 29 and 30 remain in equilibrium. The current is fed to the coils by way of the stages 37,38,39,40 which provide signals from the current as will be explained but which do not alter the current itself. 37 and 38 are differentiating stages which provide output signals proportional to the first differential of the current with respect to time and which are added by the adder 43. The differentiating stage 38 i.e. provides positive and negative output signals $+dm_2/dt$, while the other differentiating stage 37 provides positive output signals only i.e. $+dm_1/dt$ $m_1$ and $m_2$ are respectively the volumes of liquid in the respective containers 5,6. Stages 39 and 40 measure the actual currents supplied to the coils 25 and 26 and so establish the actual valume. The outputs from the current measuring stages 39 and 40 are processed by a control device 52 which contains the logic circuit for controlling the valves 8 and 9 as described above with reference to FIG. 1.

OPERATION OF PREFERRED EMBODIMENT

Let us assume that both containers 5,6 are filled to the upper marks 11 and 12, and that the two valves 8 and 9 are closed. Liquid is now removed from the second container 6 through the outlet 44. Measurement of the current variation in the coil 26 gives the value $dm_2/dt$. In this measurement, $+dm_2/dt$ means a reduction in volume in the second container 6 and $-dm_2/dt$ an increase in volume in this container 6. The value $dm_2/dt$ is generated until the liquid in this container 6 reaches the lower mark 14. The valve 8 is then opened and $dm_1/dt$ and $dm_2/dt$ are measured simultaneously and added by electronic means.

The connecting pipe 7 is constructed in such a way that the flow of the liquid between the containers 5 and 6 is approximately two times greater than the highest expected discharge rate through the outlet pipe 44. The container 6 is therefore filled again. When the liquid in this container 6 reaches the upper limit 12 again, or when the level of the liquid in the first container 5 reaches the lower mark 13, the valve 8 closes and the valve 9 opens, whereupon the container 5 is quickly filled to the upper mark 11. During this filling period, $dm_1/dt$ is not measured it being a negative quantity, and only $dm_2/dt$ appears in the total. As soon as the liquid in the first container 5 has reached the upper limit 11, the first valve 9 closes and the second valve 8 opens again. Now $dm_1/dt$ and $dm_2/dt$ are measured and totalled. In short, $dm_2/dt$ can be measured in both directions, i.e. $\pm dm_2/dt$, whereas $dm_1/dt$ can only be measured positively, so that the algebraic sum of $dm_1/dt$ and $dm_2/dt$ is always equal to the volume discharge M from the container 6.

If only M, the volume discharge, is measured, it should be clear that the measured values of the current measuring devices 39 and 40 need not be exact because these values are only used to determine the limiting value of the level of the liquid in the two containers 5 and 6. Even if these levels are not always the same, this has no effect on the measurement of dm/dt. It is also possible to carry out an integration over a specified time interval with this device if necessary. Two known methods may be used for this purpose: (1)

The output from the adder 43 can be integrated electronically. (2)

The measuring process in the current measuring stages 39 and 40 may be made more exact and the integral may be determined with corresponding logic circuit and memory elements from the number of fillings of the container 5 and the difference in the volumes in the two containers 5 and 6 at the beginning and end of measurement.

MODIFICATION OF PREFERRED EMBODIMENT

In a modification of the above described embodiment pressure cells supporting the weights of the containers 5 and 6 are used in place of the balances in order to provide electrical outputs which vary with the volumes of liquid in the two containers.

I claim:

1. Apparatus for the continuous measurement of the volume M of flow of a liquid of given specific gravity, comprising first and second containers, a liquid flow path in which the first and second containers are serially arranged, said liquid flow path including a first liquid supply pipe containing a first control valve and discharging into the first container, a second liquid flow pipe containing a second control valve and extending from said first container to said second container, and a suction pipe extending from the second container, first means providing in response to the weight of the first container a first electrical output which is a measure of the volume of liquid in the first container, second means providing in response to the weight of the second container a second electrical output which is a measure of the volume of liquid in said second container, said first and second control valves being controlled by said first and second electrical outputs attaining values signifying that the level of liquid in the respective containers has reached pre-arranged maximum and minimum levels, and differentiating circuit means providing from the differentials of said first and second electrical outputs a signal which is a continuous measure of the volume of flow per unit time of liquid provided by the apparatus.

2. Apparatus as claimed in claim 1, in which said first means and said second means each include a self-levelling balance beam and an electrically controlled force producing unit which acts on the beam in the opposite sense to the container to maintain the beam substantially stationary when the volume of liquid in the container is changing.

3. Apparatus as claimed in claim 2, in which said balance beam is a first order lever having a support for a container at one end, and a fixed weight compensating means and said force producing unit at the other end.

4. Apparatus as claimed in claim 3, in which the balance beam is suspended intermediate its ends on flexible resilient material providing a fulcrum.

5. Apparatus as claimed in claim 4, in which the force-producing unit comprises a coil whose energisation current is controllable, and a permanent magnet whose attraction to the coil is dependent upon said energisation current; and the position of a metal electrode on the beam is detected capacitively by its proximity to two parallel plates between which the electrode of the beams moves, and a capacitance-measuring circuit provides a control signal to a variable current generation which supplies the energisation current to the coil.

6. Apparatus as claimed in claim 5, in which the capacitance measuring circuit is a bridge circuit having the beam electrode influencing the capacitance of two arms and providing an output signal to a phase discriminator circuit providing the control signal to the variable current generator and fed with a high frequency signal from a generator which supplies said high frequency signal to the bridge.

7. Apparatus as claimed in claim 6, in which the variable current generator associated with each balance beam supplies the coil energisation current by way of first stage providing an adder with a signal which varies as the first differential of the energisation current, and a second stage which measures the current and controls the valve in the pipe carrying liquid into the container associated with the balance beam.

8. Apparatus as claimed in claim 7, in which one of the first stages provides a signal to the adder of constant polarity and only when the liquid level in the associated container, which is the first encountered by the liquid in the flow path, is falling, and the other first stage provides a signal to the adder of a polarity which changes in accordance with whether the liquid level in the other, or second encountered container is rising or falling, the output of the adder being a continuous measure of the volume of flow of liquid from the apparatus.

9. Apparatus as claimed in claim 8, in which liquid flows from the first encountered container to the second encountered container syphonically and the pipe through which the syphonic flow takes place has a cross-section such that it will allow liquid to flow syphonically through it at least twice the maximum rate the apparatus is required to deliver liquid.

* * * * *